US010153889B2

(12) United States Patent
Cheng et al.

(10) Patent No.: US 10,153,889 B2
(45) Date of Patent: *Dec. 11, 2018

(54) METHOD AND APPARATUS FOR HANDLING FULL-DUPLEX INTERFERENCE (71) Applicant: Huawei Technologies Co., Ltd., Shenzhen, Guangdong (CN)

(72) Inventors: Hong Cheng, Shenzhen (CN); Sheng Liu, Shenzhen (CN); Yinggang Du, Kista (SE); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

This patent is subject to a terminal disclaimer.

(21) Appl. No.: 14/529,502

(22) Filed: Oct. 31, 2014

(65) Prior Publication Data
US 2015/0055515 A1 Feb. 26, 2015

Related U.S. Application Data (63) Continuation of application No. 13/622,292, filed on Sep. 18, 2012, now Pat. No. 8,913,528, which is a (Continued)

(30) Foreign Application Priority Data

Jan. 16, 2012 (CN) .......................... 2012 1 0012324

(51) Int. Cl.
*H04L 5/00* (2006.01)
*H04B 7/005* (2006.01)
(Continued)

(52) U.S. Cl.
CPC .......... *H04L 5/0062* (2013.01); *H04L 5/0007* (2013.01); *H04L 5/0073* (2013.01); *H04L 5/14* (2013.01); *H04W 72/082* (2013.01)

(58) Field of Classification Search
None
See application file for complete search history.

(56) References Cited

U.S. PATENT DOCUMENTS 7,894,371 B2   2/2011  Bonta et al.
8,031,744 B2  10/2011  Radunovic et al.
(Continued)

FOREIGN PATENT DOCUMENTS

CN    101151812 A    3/2008
CN    101425823 A    5/2009
(Continued)

OTHER PUBLICATIONS

Dimitris Tsolkas, et al., "Increasing Spectrum Utilization in Wireless Infrastructure-based Systems", 2011 IEEE, p. 567-572.
(Continued)

*Primary Examiner* — Ayaz R Sheikh
*Assistant Examiner* — Sori A Aga (57) ABSTRACT The present invention provides a method and an apparatus for handling full-duplex interference. One method includes: obtaining an interference degree that is caused when a site device performs full-duplex transmission with at least two UEs; and determining, according to the interference degree, a UE allowed to transmit uplink and downlink signals on the same time and frequency resource among the at least two UEs. In embodiments of the present invention, a UE allowed to transmit uplink and downlink signals on the same time and frequency resource may be classified according to an interference degree that is caused when a site device performs full-duplex transmission with at least two UEs, thereby preventing the interference problem in the scenario of point-to-multipoint full-duplex communication as much as possible.

21 Claims, 5 Drawing Sheets

Related U.S. Application Data continuation of application No. PCT/CN2012/076028, filed on May 25, 2012.

(51) Int. Cl.
*H04L 5/14* (2006.01)
*H04W 72/08* (2009.01)
*H04J 3/00* (2006.01)

(56) References Cited

U.S. PATENT DOCUMENTS

| | | | |
|---|---|---|---|
| 8,913,528 B2* | 12/2014 | Cheng | H04W 72/082 |
| | | | 370/278 |
| 2007/0184782 A1 | 8/2007 | Sahota et al. | |
| 2007/0248057 A1 | 10/2007 | Keidar et al. | |
| 2008/0107046 A1 | 5/2008 | Kangasmaa et al. | |
| 2009/0213765 A1 | 8/2009 | Rinne et al. | |
| 2010/0197235 A1 | 8/2010 | Wilhelmsson | |
| 2010/0210238 A1 | 8/2010 | Cho et al. | |
| 2010/0304685 A1 | 12/2010 | Wietfeldt et al. | |
| 2011/0275399 A1 | 11/2011 | Englund et al. | |
| 2012/0257519 A1 | 10/2012 | Frank et al. | |
| 2013/0225099 A1* | 8/2013 | Vosburgh | H04B 1/525 |
| | | | 455/78 |
| 2013/0286873 A1* | 10/2013 | Wilkinson | H04W 72/1226 |
| | | | 370/252 |

FOREIGN PATENT DOCUMENTS

| | | |
|---|---|---|
| CN | 101521942 A | 9/2009 |
| CN | 101563851 A | 10/2009 |
| CN | 101754379 A | 6/2010 |
| CN | 102104404 A | 6/2011 |
| CN | 102308611 A | 1/2012 |
| GB | 2474842 A | 5/2011 |
| RU | 2417529 C2 | 4/2011 |
| WO | WO 98/30047 A1 | 7/1998 |
| WO | 2009/056410 A1 | 5/2009 |
| WO | WO 2009/063001 A2 | 5/2009 |
| WO | WO 2011/054372 A1 | 5/2011 |
| WO | WO 2011/126266 A2 | 10/2011 |

OTHER PUBLICATIONS

Evan Everett, et al., "Empowering Full-Duplex Wireless Communication by Exploiting Directional Diversity", 2011 IEEE, p. 2002-2006.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0, Mar. 2010, 104 pages.

* cited by examiner

METHOD AND APPARATUS FOR HANDLING FULL-DUPLEX INTERFERENCE

CROSS-REFERENCE TO RELATED APPLICATIONS

This application is a continuation of U.S. patent application Ser. No. 13/622,292, filed on Sep. 18, 2012, which is a continuation of International Application No. PCT/CN2012/076028, filed on May 25, 2012. The International Application claims priority to Chinese Patent Application No. 201210012324.8, filed on Jan. 16, 2012. The afore-mentioned patent applications are hereby incorporated by reference in their entireties.

TECHNICAL FIELD

The present invention relates to full-duplex technologies, and in particular, to a method and an apparatus for handling full-duplex interference, which belong to the field of communications technologies.

BACKGROUND

Full-duplex means that a transceiver transmits uplink and downlink signals simultaneously on the same time and frequency resources. The spectral efficiency of full-duplex is two times of that of simplex and half-duplex.

According to different classification manners of uplinks and downlinks on time and frequency resources in the prior art, half-duplex is classified into time division duplexing (Time Division Duplexing, TDD for short hereafter) and frequency division duplexing (Frequency Division Duplexing, FDD for short hereinafter). TDD distinguishes uplinks and downlinks by using different timeslots, for example, in a long term evolution (Long Term Evolution, LTE for short hereinafter) system, a frame is divided into an uplink sub-frame and a downlink sub-frame for uplink transmission and downlink transmission, respectively; FDD distinguishes uplinks and downlinks by using different frequency spectra.

At present, full-duplex is mainly applied to a scenario of point-to-point communication, for example, applied to WiFi communication. If it is intended to apply full-duplex to point-to-multipoint communication, for example, a scenario in which a base station communicates with multiple user equipments (User Equipment, UE for short hereinafter), how to handle signal interference becomes an urgent technical problem to be solved.

SUMMARY

Embodiments of the present invention provide a method and an apparatus for handling full-duplex interference, so as to process an interference signal in a scenario in which full-duplex is applied to point-to-multipoint communication.

An embodiment of the present invention provides a method for handling full-duplex interference, including:

obtaining an interference degree that is caused when a site device performs full-duplex transmission with at least two UEs; and determining, according to the interference degree, a UE allowed to transmitting uplink and downlink signals on the same time and frequency resource among the at least two UEs.

An embodiment of the present invention provides another method for handling full-duplex interference, including:

sending position related information to a site device; and transmitting, together with one or more other UEs, uplink and downlink signals on a same time and frequency resource, where the one or more other UEs include a UE which is determined by the site device according to the position related information and is allowed to transmitting uplink and downlink signals on the same time and frequency resource.

An embodiment of the present invention provides a site device, including:

an obtaining module, configured to obtain an interference degree that is caused when the site device performs full-duplex transmission with at least two UEs; and a determining module, configured to determine, according to the interference degree, a UE allowed to transmitting uplink and downlink signals on the same time and frequency resource among the at least two UEs.

An embodiment of the present invention provides a use equipment, including:

a sending module, configured to send position related information to a site device; and a transmitting module, configured to transmit, together with one or more other UEs, uplink and downlink signals on the same time and frequency resource, where the one or more other UEs include a UE which is determined by the site device according to the position related information and is allowed to transmitting uplink and downlink signals on the same time and frequency resource.

In the embodiments of the present invention, a site device may determine, according to an interference degree that is caused when the site device performs full-duplex transmission with at least two UEs, a UE allowed to transmitting uplink and downlink signals on the same time and frequency resource among the at least two UEs during point-to-multipoint full-duplex transmission. In this manner, UEs with low interference may transmit uplink and downlink signals on the same time and frequency resource, and UEs with high interference may transmit uplink and downlink signals on different time and frequency resources. Therefore, in the embodiments of the present invention, a UE allowed to transmitting uplink and downlink signals on the same time and frequency resource may be classified according to an interference degree that is caused when a site device performs full-duplex transmission with at least two UEs, thereby preventing the interference problem in the scenario of point-to-multipoint full-duplex communication as much as possible.

BRIEF DESCRIPTION OF THE DRAWINGS

To illustrate the technical solutions according to the embodiments of the present invention or in the prior art more clearly, accompanying drawings required for describing the embodiments or the prior art are introduced briefly below. Apparently, the accompanying drawings in the following description are merely some embodiments of the present invention, and persons of ordinary skill in the art may further obtain other drawings according to the accompanying drawings without creative efforts.

DETAILED DESCRIPTION

To make the objectives, technical solutions, and advantages of the embodiments of the present invention clearer, the following clearly and completely describes the technical solutions provided by the embodiments of the present invention with reference to the accompanying drawings. Evidently, the described embodiments are only some exemplary embodiments of the present invention, rather than all embodiments of the present invention. All other embodiments, which can be derived by persons of ordinary skill in the art based on the embodiments of the present invention without any creative effort, shall fall within the protection scope of the present invention.

In the embodiments of the present invention, under the condition that a site device has a full-duplex capability, part of time and frequency resources are used as downlink resources of some UEs, and at the same time, used as uplink resources of some one or more other UEs. In this manner, the same time and frequency resources are used in both downlink transmission and uplink reception. Compared with TDD and FDD systems, the spectral efficiency is doubled, and UEs do not need to have a full-duplex capability of separating interference signals.

Specifically, on a given time and frequency resource, some UEs send uplink signals to the site device, where the uplink signals include data messages and control messages. At the same time, one or more other UEs receive downlink signals sent by the site device on one time and frequency resource, where the downlink signals also include data messages and control messages. On one time and frequency resource using full-duplex, the site device may obtain an uplink received signal, after self-interference is cancelled by methods, such as antenna interference cancellation, interference avoidance over vector spaces, separation of analog interference signals, and separation of digital interference signals. The follow-up processing of the uplink received signal is the same as that in half-duplex, such as layer mapping, and demodulation and decoding. A transmitting module of the site device may further generate, through coil coupling, a transmit signal on its analog front-end, and then feed the transmit signal to a receiving module of the site device after the signal undergoes signal attenuation and delay the amount of which matches a channel between a transmitting antenna and a receiving antenna of the site device, where the receiving module may perform analog domain interference cancellation on the analog front-end through a self-interference signal fed back by the transmitting module, so as to prevent a high-power self-interference signal from blocking a low-noise amplifier of the receiving module and decreasing signal power of the self-interference.

During research, it is found that when full-duplex is applied to a point-to-multipoint communication scenario, for example, when a base station performs full-duplex transmission with multiple UEs, mutual interference may occur among uplink and downlink signals of the multiple UEs, or self-interference may occur when the base station performs full-duplex transmission with the multiple UEs. Specifically, if a UE performing uplink transmission on a given time and frequency resource is close to a UE performing downlink reception on the same time and frequency resource, the UE performing downlink reception may be affected seriously, that is, mutual interference may occur between an uplink signal and a downlink signal. Moreover, if a UE performing uplink transmission on one time and frequency resource is far away from the base station, the power of the uplink signal received by the base station is low. If a UE performing downlink reception on one time and frequency resource is also far away from the base station, the power of the transmission function of the base station is strong in order to ensure the signal reception quality of the UE performing downlink reception. Therefore, a transmit signal of the base station causes strong interference on a received signal of the base station, that is, the so-called self-interference occurs. In this case, high requirements are imposed on self-interference cancellation.

It should be noted that the embodiments of the present invention do not limit the type of interference, and persons skilled in the art should understand that interference that occurs during the full-duplex transmission in the embodiments of the present invention may be any interference caused by point-to-multipoint full-duplex transmission.

In the embodiments of the present invention, a site device is required to have a full-duplex capability only, and a UE needs to have a half-duplex capability only and does not need to have the full-duplex capability.

In addition, the site device in the embodiments of the present invention may be a base station in a cellular network, for example, a macro base station, a Pico base station, or a Femto base station, or may be an access point (Access Point, AP for short hereinafter) in a WiFi system, and the site device in the embodiments may be a network side device in a scenario of point-to-multipoint full-duplex transmission, which is not limited in the embodiments.

Figure 1:
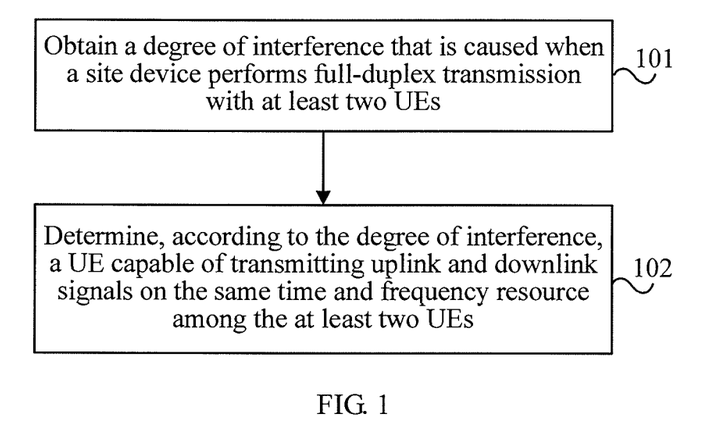
FIG. 1 is a flowchart of a first embodiment of a method for handling full-duplex interference according to the present invention.

An interference handling solution in the scenario of point-to-multipoint full-duplex communication is described in the following:

FIG. 1 is a flowchart of a first embodiment of a method for handling full-duplex interference according to the present invention. As shown in FIG. 1, the method according to this embodiment may include:

Step 101: Obtain an interference degree that is caused when a site device performs full-duplex transmission with at least two UEs.

Step 102: Determine, according to the interference degree, a UE allowed to transmitting uplink and downlink signals on a same time and frequency resource among the at least two UEs.

Specifically, during point-to-multipoint transmission, no matter what kind of interference occurs, the interference is caused by multiple UEs which perform uplink and downlink transmission on the same time and frequency resource. Therefore, in this embodiment, the site device may determine, according to an interference degree during full-duplex transmission, a UE allowed to transmitting uplink and downlink signals on the same time and frequency resource among the at least two UEs during point-to-multipoint full-duplex transmission. In this manner, UEs with low interference may transmit uplink and downlink signals on the same time and frequency resource, and UEs with high interference may transmit uplink and downlink signals on different time and frequency resources. Therefore, in this embodiment, UEs allowed to transmitting uplink and downlink signals on the same time and frequency resource may be classified according to an interference degree during full-duplex communication, thereby preventing the interference problem in the scenario of point-to-multipoint full-duplex communication as much as possible.

In another embodiment of the present invention, step 101 may specifically be:

obtaining a degree of mutual interference between uplink and downlink signals of the at least two UEs during full-duplex transmission; and/or, obtaining a degree of self-interference of a transmit signal on a received signal during full-duplex transmission.

The processes of handling the mutual interference and the self-interference are described in detail in the following through several specific embodiments.

Figure 2:
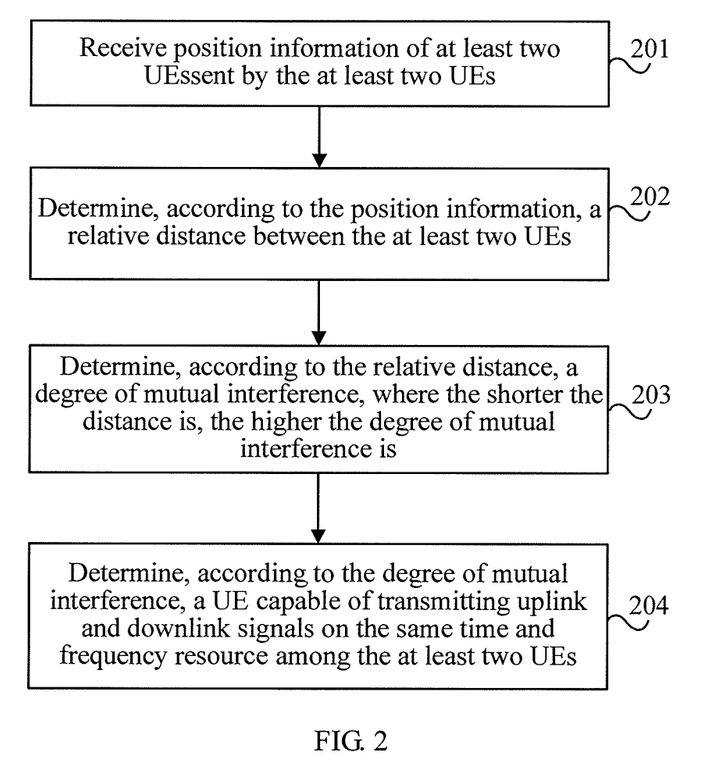
FIG. 2 is a flowchart of a second embodiment of the method for handling full-duplex interference according to the present invention.

FIG. 2 is a flowchart of a second embodiment of the method for handling full-duplex interference according to the present invention. As shown in FIG. 2, the method according to this embodiment provides a technical solution to mutual interference. The method according to this embodiment may include:

Step 201: Receive position information of at least two UEs sent by the at least two UEs.

This embodiment is still described by taking a base station in a cellular network as an example. The base station may receive the position information of the at least two UEs sent by at least two UEs.

To solve the problem of mutual interference caused by the case that UEs which are in a short distance between each other perform uplink and downlink transmission on the same time and frequency resource, in this embodiment, UEs in a long distance between each other are enabled to perform uplink and downlink transmission on the same time and frequency resource. In this manner, when an uplink signal sent by an uplink UE on one time and frequency resource reaches a downlink UE receiving a downlink signal on one time and frequency resource, its signal strength is attenuated to a low level, which is close to a noise level. In a 3GPP LTE system, the maximum transmit power of a UE is 20 dBm, and the maximum transmit power of a Femto base station is 24 dBm. According to a path loss model in 3GPP TR36.814, the radius of a coverage range of a Femto base station is 10 meters. In this manner, when the distance between UEs is longer than 10 meters, the mutual interference may be ignored.

Therefore, to determine a distance between at least two UEs or path loss between at least two UEs, each UE may report its respective position information to a base station in this embodiment. Specifically, each UE may obtain its respective position information by using a positioning system, such as Global Positioning System (Global Positioning System, GPS for short hereinafter) or BeiDou Navigation Satellite System.

It should be noted that this embodiment does not limit the specific manner in which a UE obtains its position information and does not require all UEs to report their respective position information simultaneously. In this embodiment, each UE may report its respective position information periodically or non-periodically.

Step 202: Determine, according to the position information of the at least two UEs, a relative distance between the at least two UEs.

After obtaining the position information of each UE, the base station may determine a relative distance between these UEs, so as to learn which UEs are relatively close to each other or which two UEs are relatively close to each other, or learn which UEs are relatively far away from each other or which two UEs are relatively far away from each other.

Step 203: Determine, according to the relative distance, a degree of mutual interference, where the shorter the distance is, the higher the degree of mutual interference is.

After determining the relative distance between the UEs, that is, after obtaining the path loss between the UEs, the base station may determine a degree of mutual interference. Specifically, the shorter the relative distance between the UEs is, the higher the mutual interference is; the longer the relative distance between the UEs is, the lower the mutual interference is.

Step 204: Determine, according to the degree of mutual interference, a UE allowed to transmitting uplink and downlink signals on the same time and frequency resource among the at least two UEs.

After determining the degree of mutual interference, the base station may determine a UE allowed to transmitting uplink and downlink signals on the same time and frequency resource among the at least two UEs.

Specifically, two or more UEs with low mutual interference are allowed to transmit uplink and downlink signals on the same time and frequency resource, and two or more UEs with high mutual interference are not allowed to transmitting uplink and downlink signals on the same time and frequency resource. In specific implementation, a value may be used to measure the degree of the mutual interference. If the mutual interference between two or more UEs is greater than a threshold, the UEs are not allowed to transmitting uplink and downlink signals on the same time and frequency resource; if the mutual interference is smaller than or equal to a threshold, the UEs are allowed to transmitting uplink and downlink signals on the same time and frequency resource. The selection of the threshold may be set through experiments and according to requirements for interference cancellation.

Optionally, for a UE located at the edge of a cell, the mutual interference may be caused from a UE of a neighboring cell. Therefore, in this embodiment, the base station may determine that a UE is currently located at the edge of the current cell and the UE may impose mutual interference on a UE of a neighboring cell. Accordingly, the base station may also send the position information of the UE located at the edge of the cell to a neighboring base station, so that the neighboring base station may also determine a degree of mutual interference by using the method according to this embodiment.

In this embodiment, the base station may receive position information of at least two UEs reported by the at least two UEs, determine a degree of mutual interference according to the position information of the at least two UEs, and determine, according to the degree of mutual interference, a UE allowed to transmitting uplink and downlink signals on the same time and frequency resource among the at least two UEs during point-to-multipoint full-duplex transmission. In this manner, UEs with low mutual interference may transmit uplink and downlink signals on the same time and frequency resource, and UEs with high mutual interference may transmit uplink and downlink signals on different time and frequency resources, thereby preventing the mutual interference problem in the scenario of point-to-multipoint full-duplex communication as much as possible.

In the second embodiment of the method for handling full-duplex interference, UEs actively report their respective position information, so that a site device determines a degree of mutual interference according to the position information. In another embodiment of the method for handling full-duplex interference according to the present invention, a UE may not need to report its position information to a site device, and the site device may determine the position information of the UE according to an uplink signal received from the UE. In specific implementation, the site device may determine the position information of the UE according to a direction of arrival (direction of arrival, DoA for short hereinafter), time of arrival (time of arrival, ToA for short hereinafter), a time difference of arrival (time difference of arrival, TDoA for short hereinafter), or received signal strength (Received signal strength, RSS for short hereinafter) of the uplink signal that is sent by the UE.

Figure 3:
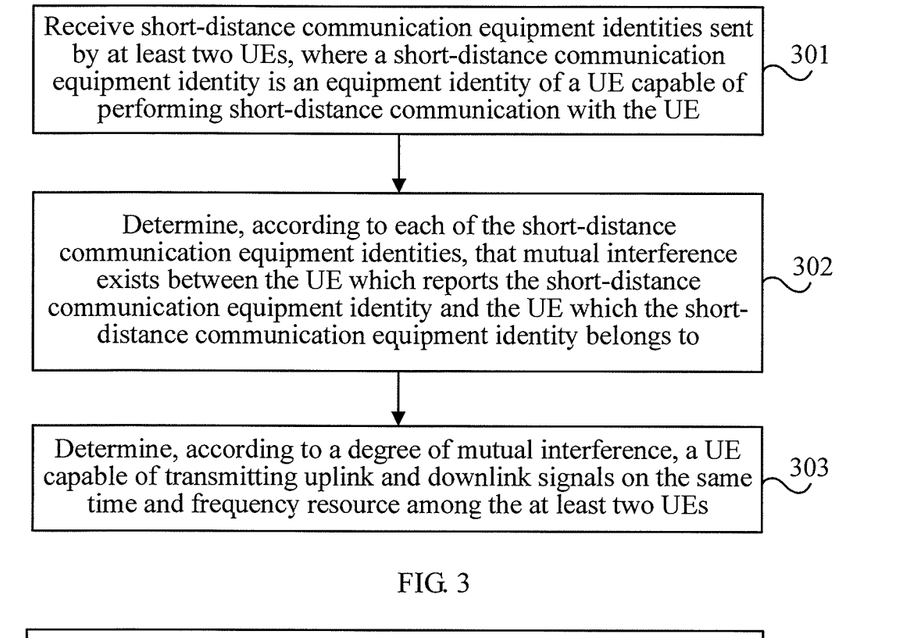
FIG. 3 is a flowchart of a third embodiment of the method for handling full-duplex interference according to the present invention.

FIG. 3 is a flowchart of a third embodiment of the method for handling full-duplex interference according to the present invention. As shown in FIG. 3, the method according to this embodiment provides another technical solution to mutual interference. The method according to this embodiment may include:

Step 301: Receive short-distance communication equipment identities sent by at least two UEs, where a short-distance communication equipment identity is an equipment identity of a UE used to perform short-distance communication.

Step 302: Determine, according to each of the short-distance communication equipment identities, that mutual interference exists between the UE which reports the short-distance communication equipment identity and the UE which the short-distance communication equipment identity belongs to.

Step 303: Determine, according to a degree of mutual interference, a UE allowed to transmitting uplink and downlink signals on a same time and frequency resource among the at least two UEs.

The difference between this embodiment and the embodiment shown in FIG. 2 lies in that the relative distance between the UEs is determined in this embodiment by using a manner of reporting short-distance communication equipment identities.

Specifically, a UE may measure path loss between UEs or path quality by using a manner of short-distance communication. The UE may bind its short-distance equipment communication identity such as its WiFi or Bluetooth equipment number to its mobile identity such as an international mobile subscriber identification number (International Mobile Subscriber Identification Number, IMSI for short hereinafter). Accordingly, a base station may determine the specific UE according to the short-distance communication equipment identity. In specific implementation, the UE may detect other surrounding UEs allowed to performing short-distance communication with the UE by using a WiFi or Bluetooth function, where these UEs which can be detected are close to the UE, and therefore, these UEs are not suitable for transmitting uplink and downlink signals together with the UE on the same time and frequency resource. The UE may report, to the base station, the short-distance communication equipment identities of the surrounding UEs which can be detected by the UE, and the base station may determine, according to the short-distance communication equipment identities reported by the UE, that mutual interference exists between the UE and the UEs which are corresponding to the short-distance communication equipment identities. According to this, the base station may determine, according to the determined degree of mutual interference, a UE allowed to transmitting uplink and downlink signals on the same time and frequency resource among the at least two UEs.

Optionally, for a UE located at the edge of a cell, the mutual interference may be caused from a UE of a neighboring cell. Therefore, in this embodiment, the base station may determine that a UE corresponding to a short-distance communication equipment identity does not belong to a current cell, but belongs to a neighboring cell. Accordingly, the base station may also send the short-distance communication equipment identity to the neighboring cell, so that the neighboring base station may also determine a degree of mutual interference by using the method according to this embodiment.

In this embodiment, the base station may receive short-distance communication equipment identities reported by at least two UEs, determine that mutual interference exists between the UE and a UE corresponding to a short-distance communication equipment identity and then determine, according to a determined degree of mutual interference, a UE allowed to transmitting uplink and downlink signals on the same time and frequency resource among the at least two UEs. In this manner, UEs with low mutual interference may transmit uplink and downlink signals on the same time and frequency resource, and UEs with high mutual interference may transmit uplink and downlink signals on different time and frequency resources, thereby preventing the mutual interference problem in the scenario of point-to-multipoint full-duplex communication as much as possible.

Figure 4:
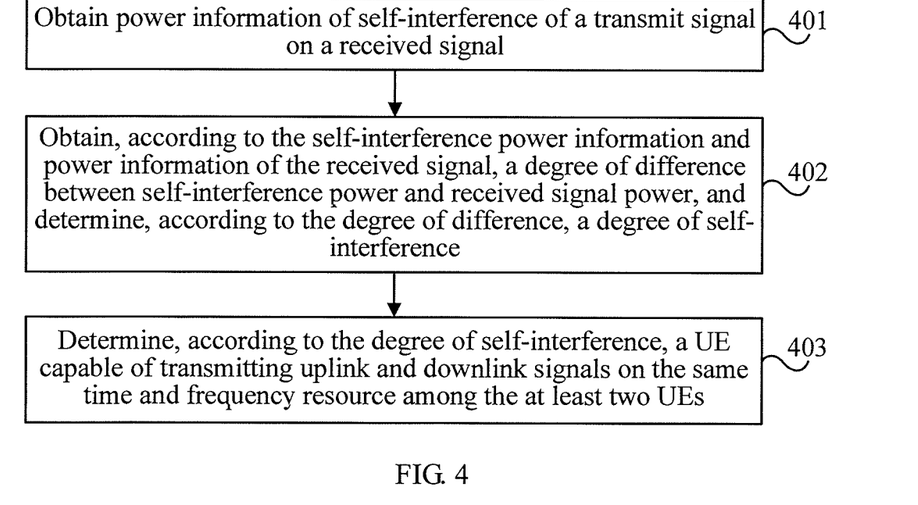
FIG. 4 is a flowchart of a fourth embodiment of the method for handling full-duplex interference according to the present invention.

FIG. 4 is a flowchart of a fourth embodiment of the method for handling full-duplex interference according to the present invention. As shown in FIG. 4, the method according to this embodiment provides a technical solution to self-interference. The method according to this embodiment may include:

Step 401: Obtain power information of self-interference of a transmit signal on a received signal.

Step 402: Obtain, according to the power information of self-interference and power information of the received signal, a degree of difference between self-interference power and received signal power, and determine, according to the degree of difference, a degree of self-interference.

Step 403: Determine, according to the degree of self-interference, a UE allowed to transmitting uplink and downlink signals on the same time and frequency resource among the at least two UEs.

This embodiment is still described by taking a base station in a cellular network an example. Specifically, it can be learned from the foregoing analysis on self-interference that self-interference is interference of a transmit signal of a base station on a received signal of the base station. In a scenario of point-to-multipoint full-duplex transmission, if a UE which performs uplink transmission on the a time and frequency resource is far away from the base station, and a UE which performs downlink reception on one time and frequency resource is also far away from the base station, the self-interference of the transmit signal on the received signal at the base station side is strong. In this embodiment, the base station may obtain a degree of self-interference, and determine, according the degree of self-interference, UEs performing uplink and downlink transmission on the same time and frequency resource, so that the power of the uplink signal received by the base station on the same time and frequency resource is as high as possible, and the power of the downlink signal transmitted is as low as possible, thereby decreasing the degree of self-interference of the transmit signal on the received signal.

In specific implementation, multiple UEs may be used in this embodiment, where a UE close to the base station performs uplink transmission on one time and frequency resource, and a UE far away from or close to the base station performs downlink reception on one time and frequency resource; or, a UE close to or far away from the base station among the multiple UEs performs uplink transmission on one time and frequency resource, and a UE close to the base station performs downlink reception on one time and frequency resource.

To achieve the foregoing objective, a self-interference separation degree is used in this embodiment as a basis to determine which UEs are allowed to performing uplink and downlink transmission on the same time and frequency resource, where the self-interference separation degree is used to measure a degree of difference between self-interference signal power and received signal power. Specifically, the base station may obtain power information of self-interference of a transmit signal on a received signal. In specific implementation, the base station may estimate path loss of the received signal according to a reference signal, and the base station may obtain power of its transmit signal, so as to estimate power information of self-interference according to the path loss of the received signal and the power of the transmit signal or directly use the path loss as power information of self-interference. Then, the base station may obtain a degree of self-interference according to the estimated power information of self-interference and the power information of the received signal, where the degree of self-interference may represent the self-interference separation degree, and the larger the difference between the self-interference power and the received signal power is, the greater the difficulty of self-interference separation is. Therefore, after obtaining the degree of self-interference, the base station may classify UEs allowed to transmitting uplink and downlink signals on the same time and frequency resource among multiple UEs, so as to decrease the self-interference produced at the base station side as much as possible.

In the embodiment, the site device may obtain power information of self-interference of a transmit signal on a received signal, obtain a degree of self-interference according to the power information of self-interference and power information of the received signal, and determine, according the degree of self-interference, UEs performing uplink and downlink transmission on the same time and frequency resource, so that the power of the uplink signal received by the site device on the same time and frequency resource is as high as possible, and the power of the downlink signal transmitted is as low as possible, thereby decreasing the degree of self-interference of the transmit signal on the received signal in the scenario of point-to-multipoint full-duplex transmission.

In another solution provided in the embodiment of the present invention, interference separation may be performed based on a direction of arrival of a signal in the scenario of point-to-multipoint full-duplex transmission. Specifically, an uplink signal received by a receiving antenna of the site device and a self-interference signal from a transmitting antenna may come from different directions. Because the directionality of the self-interference signal is strong and there is usually no obstacle between the transmitting antenna and the receiving antenna, self-interference reaches the receiving antenna through a direct path. On a given time and frequency resource used in full-duplex, if self-interference received by the receiving antenna comes from a certain direction, the site device may select a position of an uplink UE, so that the direction of an uplink signal reaching the receiving antenna of the site device is separated from the direction of the self-interference in angle, that is, the direction of an uplink signal reaching the receiving antenna of the site device is different from the direction of the self-interference. Then, the power level of self-interference may be effectively decreased through directional reception of an array antenna. Moreover, to improve the directionality of two paths of signals, a transmitting module of the site device and a multi-antenna UE performing uplink transmission may transmit signals by using a beamforming manner.

In specific implementation, the following two specific implementation solutions may be used in all of steps 3102, 204, 303, and 403 to implement resource scheduling for UEs performing uplink and downlink transmission on the same time and frequency resource.

Solution 1: Determine, according to the interference degree, one or more UEs transmitting uplink signals and one or more UEs receiving downlink signals on one time and frequency resource unit among at least two UEs.

Specifically, the solution may be used to perform processing for each time and frequency resource unit, where the time and frequency resource unit may be, for example, a resource block (Resource Block, RB for short hereinafter).

For the time and frequency resource unit on which full-duplex transmission is used, the site device may first determine a schedule weight of uplink transmission and downlink transmission performed by each UE on one time and frequency resource unit, according to a channel condition, a transmission load and fairness of each UE on one time and frequency resource unit.

The site device may determine, according the uplink (downlink) schedule weights, UEs transmitting (receiving) uplink (downlink) signals on one time and frequency resource unit, and then determine, according to the interference degree and the downlink (uplink) schedule weights, UEs receiving (transmitting) downlink (uplink) signals on one time and frequency resource.

Solution 2: Determine, according to the interference degree, one or more UEs transmitting uplink signals and one or more UEs receiving downlink signals among the at least two UEs, and then determine a time and frequency resource unit on which the uplink signals and the downlink signals are transmitted simultaneously.

Specifically, the site device may determine a combination of UEs allowed to performing uplink and downlink transmission simultaneously and a schedule weight of the combination during full-duplex transmission, according to information such as the interference degree and a channel condition, a transmission load and fairness of each UE on one time and frequency resource unit. Then, the site device may determine, according to the schedule weights during full-duplex transmission, UE combinations for uplink and downlink transmission on all time and frequency resource units on which full-duplex transmission is performed.

It should be noted that if there is only one determined UE that transmits uplink and downlink signals on one time and frequency resource, the site device may implement scheduling of uplink and downlink resources by using point-to-point full-duplex or half-duplex, which is not described in detail herein again.

In addition, it should be noted that in the foregoing embodiment of the present invention, the number of UEs transmitting uplink signals on one time and frequency resource unit may be at least two, and signal vector spaces of the UEs are orthogonal to each other; and the number of UEs receiving downlink signals on one time and frequency resource unit may also be at least two, and signal vector spaces of the UEs are orthogonal to each other.

Specifically, in a conventional full-duplex transmission system, only one transmission direction of one UE can be scheduled on each time and frequency resource unit. In the multi-user multiple-input multiple-output (Multi-user Multiple-Input Multiple-Output, MU-MIMO for short hereinafter) technology, multiple UEs in the same transmission direction may be scheduled on the same time and frequency resource unit, and the multiple UEs may be distinguished through the orthogonality of signal vector spaces. Therefore, in the foregoing embodiment of present invention, multiple UEs in two transmission directions, that is, the uplink transmission direction and the downlink reception direction, may be scheduled on the same time and frequency resource unit. When UEs are selected for a given time and frequency resource unit, multiple UEs may be selected in each transmission direction, and UEs with the greatest scheduling coefficient among the remaining UEs and their transmission directions are selected in sequence on the basis that at least one of the following conditions is satisfied: a mutual interference separation condition, a self-interference separation condition or a condition of separation based on signal direction of arrival, and a multi-user orthogonal condition of signal vector spaces. In specific implementation, the full-duplex transmission and MU-MIMO joint scheduling may be performed in sequence until at least one of the foregoing constraint conditions is not satisfied. The number of UEs scheduled and the set of candidate UEs may be considered base on a compromise between spectrum utilization and scheduling complexity.

Figure 5:
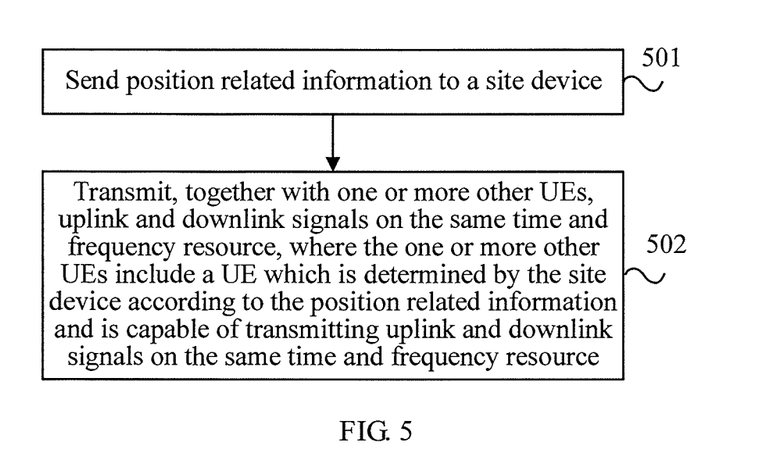
FIG. 5 is a flowchart of a fifth embodiment of the method for handling full-duplex interference according to the present invention.

FIG. 5 is a flowchart of a fifth embodiment of the method for handling full-duplex interference according to the present invention. As shown in FIG. 5, the method according to this embodiment may include:

Step 501: Send position related information to a site device; and

Step 502: Transmit, together with one or more other UEs, uplink and downlink signals on a same time and frequency resource, where the one or more other UEs include a UE which is determined by the site device according to the position related information and is allowed to transmitting uplink and downlink signals on the same time and frequency resource.

In specific implementation, the position related information may be the position information of a UE reported by the UE, an uplink signal used for positioning, or an obtained short-distance communication equipment identity of a detected surrounding UE allowed to performing short-distance communication.

Therefore, before step 501, the method may further include obtaining position information of the UE by using a positioning system such as GPS and/or BeiDou Navigation Satellite System. Accordingly, step 501 may specifically be sending the position information of the UE to the site device.

Alternatively, before step 501, the method may further include detecting a surrounding UE allowed to performing short-distance communication and obtaining a short-distance communication equipment identity of the detected UE. Accordingly, step 502 may specifically be sending the short-distance communication equipment identity to the site device.

Alternatively, the position related information sent by the UE to the site device is an uplink signal, and the site device may determine, according to the uplink signal, the position information of the UE.

The method in this embodiment is a technical solution executed by a UE and corresponding to the technical solution executed by a site device in the method embodiment shown in FIG. 2 or FIG. 3, and the implementation principles thereof are similar, so the details are not described herein again.

Figure 6:
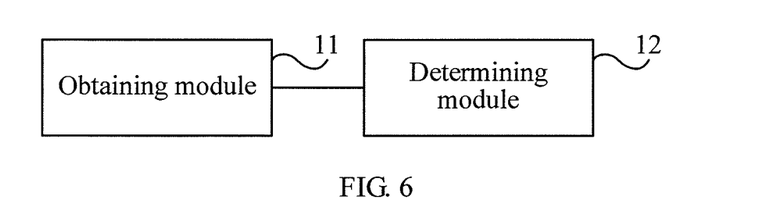
FIG. 6 is a schematic structural diagram of a first embodiment of a site device according to the present invention.

FIG. 6 is a schematic structural diagram of a first embodiment of a site device according to the present invention. As shown in FIG. 6, the site device according to this embodiment may include an obtaining module 11 and a determining module 12, where the obtaining module 11 is configured to obtain an interference degree that is caused when the site device performs full-duplex transmission with at least two UEs; and the determining module 12 is configured to determine, according to the interference degree, a UE allowed to transmitting uplink and downlink signals on a same time and frequency resource among the at least two UEs.

The site device according to this embodiment may be configured to implement the technical solution of the method embodiment shown in FIG. 1, and its implementation principles and technical effects are similar to those in the method embodiment, so the details are not described herein again.

In another embodiment of the site device according to the present invention, furthermore, the obtaining module is specifically configured to obtain a degree of mutual interference between uplink and downlink signals of the at least two UEs during full-duplex transmission; and/or, obtain a degree of self-interference of a transmit signal on a received signal during full-duplex transmission.

Figure 7:
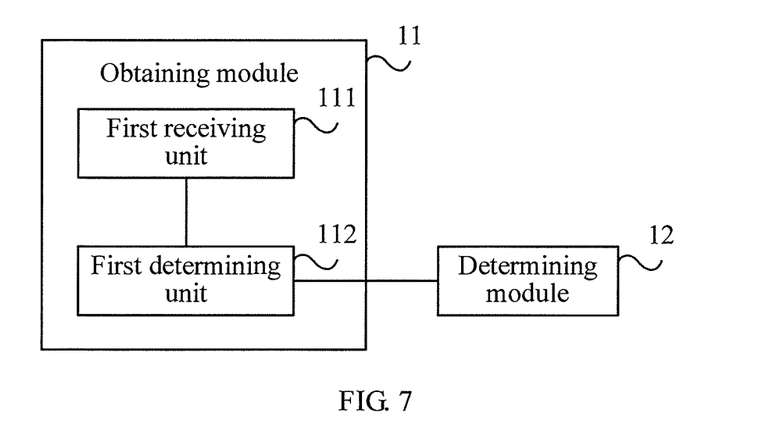
FIG. 7 is a schematic structural diagram of a second embodiment of the site device according to the present invention.

FIG. 7 is a schematic structural diagram of a second embodiment of the site device according to the present invention. As shown in FIG. 7, in the site device according to this embodiment, based on the site device shown in FIG. 6, the obtaining module 11 includes a first receiving unit 111 and a first determining unit 112, where the first receiving unit 111 is configured to receive position information of the at least two UEs sent by the at least two UEs; and the first determining unit 112 is configured to determine, according to the position information of the at least two UEs, a relative distance between the at least two UEs; and determine, according to the relative distance, the degree of mutual interference, where the shorter the relative distance is, the higher the degree of mutual interference is.

The site device according to this embodiment may be configured to implement the technical solution of the method embodiment shown in FIG. 2, and its implementation principles and technical effects are similar to those in the method embodiment, so the details are not described herein again.

Figure 8:
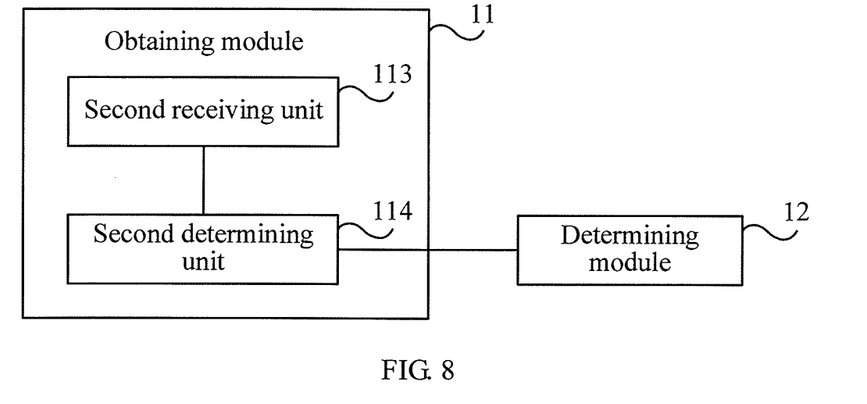
FIG. 8 is a schematic structural diagram of a third embodiment of the site device according to the present invention.

FIG. 8 is a schematic structural diagram of a third embodiment of the site device according to the present invention. As shown in FIG. 8, in the site device according to this embodiment, based on the site device shown in FIG. 6, the obtaining module 11 includes a second receiving unit 113 and a second determining unit 114, where the second receiving unit 113 is configured to receive uplink signals sent by the at least two UEs; and the second determining unit 114 is configured to determine, according to the uplink signals, position information of the at least two UEs; determine, according to the position information of the UE, a relative distance between the at least two UEs; and determine, according to the relative distance, the degree of mutual interference, where the shorter the relative distance is, the higher the degree of mutual interference is.

In this embodiment, the site device may determine, according to an uplink signal sent by the UE, position information of the UE, so as to determine a degree of mutual interference according to position information of each UE.

Figure 9:
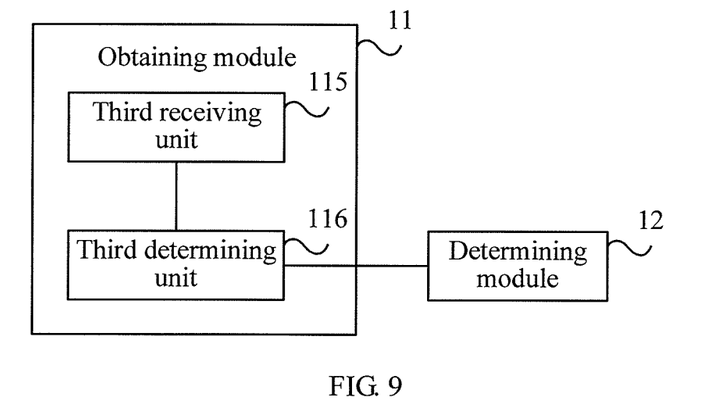
FIG. 9 is a schematic structural diagram of a fourth embodiment of the site device according to the present invention.

FIG. 9 is a schematic structural diagram of a fourth embodiment of the site device according to the present invention. As shown in FIG. 9, in the site device according to this embodiment, based on the site device shown in FIG. 6, the obtaining module 11 includes a third receiving unit 115 and a third determining unit 116, where the third receiving unit 115 is configured to receive short-distance communication equipment identities sent by the at least two UEs, where a short-distance communication equipment identity is an equipment identity of a UE allowed to performing short-distance communication with the UE; and the third determining unit 116 is configured to determine, according to each of the short-distance communication equipment identities, that mutual interference exists between the UE which reports the short-distance communication equipment identity and the UE which the short-distance communication equipment identity belongs to.

The site device according to this embodiment may be configured to implement the technical solution of the method embodiment shown in FIG. 3, and its implementation principles and technical effects are similar to those in the method embodiment, so the details are not described herein again.

Figure 10:
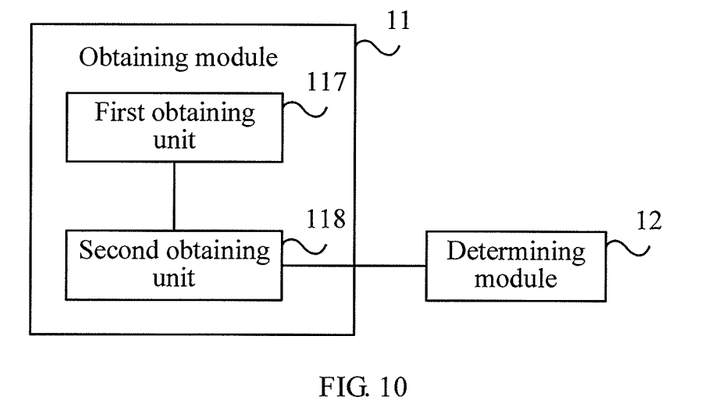
FIG. 10 is a schematic structural diagram of a fifth embodiment of the site device according to the present invention.

FIG. 10 is a schematic structural diagram of a fifth embodiment of the site device according to the present invention. As shown in FIG. 10, in the site device according to this embodiment, based on the site device shown in FIG. 6, the obtaining module 11 includes a first obtaining unit 117 and a second obtaining unit 118, where the first obtaining unit 117 is configured to obtain power information of self-interference of the transmit signal on the received signal; and the second obtaining unit 118 is configured to obtain, according to the power information of self-interference and power information of the received signal, a degree of difference between self-interference power and received signal power, and determine, according to the degree of difference, a degree of self-interference.

The site device according to this embodiment may be configured to implement the technical solution of the method embodiment shown in FIG. 4, and its implementation principles and technical effects are similar to those in the method embodiment, so the details are not described herein again.

In an embodiment of the foregoing site device according to the present invention, the determining unit 12 may be specifically configured to determine, according to the interference degree, one or more UEs transmitting uplink signals and one or more UEs receiving downlink signals on one time and frequency resource unit among the at least two UEs, or determine, according to the interference degree, one or more UEs transmitting uplink signals and one or more UEs receiving downlink signals among the at least two UEs, and then determine a time and frequency resource unit on which the uplink signals and the downlink signals are transmitted simultaneously.

Figure 11:
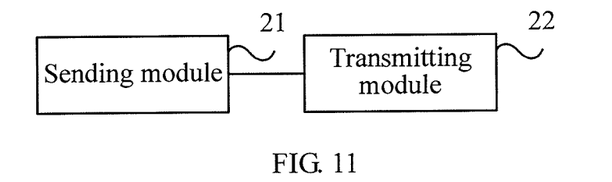
FIG. 11 is a schematic structural diagram of a first embodiment of a user equipment according to the present invention.

FIG. 11 is a schematic structural diagram of a first embodiment of a user equipment according to the present invention. As shown in FIG. 11, the UE according to this embodiment may include a sending module 21 and a transmitting module 22, where the sending module 21 is configured to send position related information to a site device; and the transmitting module 22 is configured to transmit, together with one or more other UEs, uplink and downlink signals on a same time and frequency resource, where the one or more other UEs include a UE which is determined by the site device according to the position related information and is allowed to transmitting uplink and downlink signals on the same time and frequency resource.

The UE according to this embodiment is configured to implement, together with the site device shown in FIG. 6, the technical solution of the method embodiment shown in FIG. 1, and its implementation principles and technical effects are similar to those in the method embodiment, so the details are not described herein again.

Figure 12:
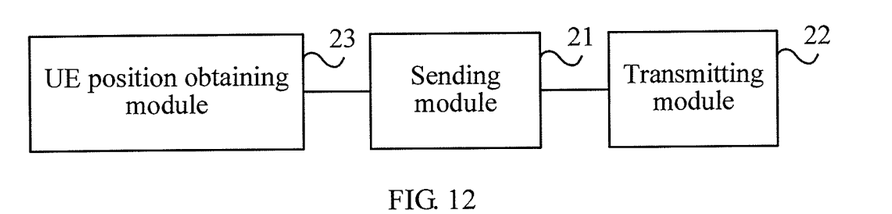
FIG. 12 is a schematic structural diagram of a second embodiment of the user equipment according to the present invention.

FIG. 12 is a schematic structural diagram of a second embodiment of the user equipment according to the present invention. As shown in FIG. 12, based on the UE shown in FIG. 11, the UE according to this embodiment also further includes a UE position obtaining module 23, configured to obtain position information of the UE by using a positioning system, where the sending module 21 is specifically configured to send the position information of the UE to a site device.

The UE according to this embodiment is configured to implement, together with the site device shown in FIG. 7, the technical solution of the method embodiment shown in FIG. 2, and its implementation principles and technical effects are similar to those in the method embodiment, so the details are not described herein again.

In another embodiment of the user equipment according to the present invention, the sending module 21 shown in FIG. 10 may be configured to send an uplink signal to a site device, so as to implement, together with the site device shown in FIG. 8, the technical solution.

Figure 13:
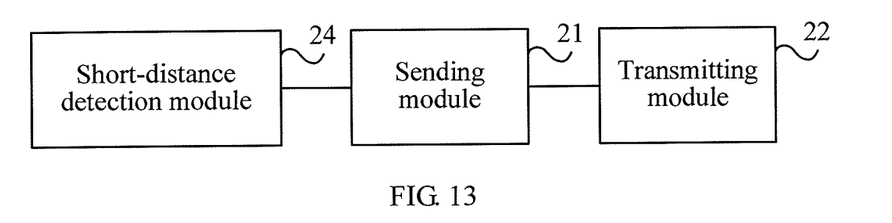
FIG. 13 is a schematic structural diagram of a third embodiment of the user equipment according to the present invention.

FIG. 13 is a schematic structural diagram of a third embodiment of the user equipment according to the present invention. As shown in FIG. 13, based on the UE shown in FIG. 11, the UE according to this embodiment also further includes a short-distance detection module 24, configured to detect a surrounding UE allowed to performing short-distance communication and obtain a short-distance communication equipment identity of the detected UE, where the sending module 21 is specifically configured to send the short-distance communication equipment identity to a site device.

The UE according to this embodiment is configured to implement, together with the site device shown in FIG. 9, the technical solution of the method embodiment shown in FIG. 3, and its implementation principles and technical effects are similar to those in the method embodiment, so the details are not described herein again.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium allowed to storing program codes, such as a ROM, a RAM, a magnetic disk, or a CD-ROM.

Finally, it should be noted that the embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some or all the technical features in the technical solutions, as long as such modifications or replacements do not depart from the scope of the technical solutions of the embodiments of the present invention.

What is claimed is:

1. A method for handling full-duplex interference, by a site device, the method comprising:
   receiving uplink signals from at least two user equipments (UEs);
   obtaining an interference degree that is caused when the site device performs full-duplex transmission with the at least two UEs;
   determining according to the interference degree among the at least two UEs, one or more UEs transmitting uplink signals and one or more UEs receiving downlink signals on one time and frequency resource unit on which the uplink signals and the downlink signals are transmitted simultaneously; and
   determining the time and frequency resource unit configured to transmit the uplink signals and the downlink signals simultaneously.

2. The method according to claim 1, wherein obtaining an interference degree that is caused when the site device performs full-duplex transmission with at least two UEs further comprises:
   obtaining a degree of mutual interference between uplink and downlink signals of the at least two UEs during full-duplex transmission, or
   obtaining a degree of self-interference of a transmit signal on a received signal of the site device during full-duplex transmission.

3. The method according to claim 1, wherein obtaining a degree of mutual interference between uplink and downlink signals of the at least two UEs during full-duplex transmission comprises:
   obtaining position related information of the at least two UEs; and
   obtaining, according to the position related information, the degree of mutual interference between uplink and downlink signals of the at least two UEs during full-duplex transmission.

4. The method according to claim 3, wherein:
   receiving the uplink signals from the at least two UEs comprises:
      receiving position information of the at least two UEs sent by the at least two UEs; and
   obtaining, according to the position related information, a degree of mutual interference between uplink and downlink signals of the at least two UEs during full-duplex transmission comprises:
      determining, according to the position information of the at least two UEs, a relative distance between the at least two UEs; and
      determining, according to the relative distance, the degree of mutual interference, wherein the shorter the relative distance is, the higher the degree of mutual interference is.

5. The method according to claim 3, wherein:
   receiving the uplink signals from the at least two UEs comprises:
      receiving short-distance communication equipment identities sent by the at least two UEs, wherein a short-distance communication equipment identity is an equipment identity of a UE allowed to performing short-distance communication; and
   obtaining, according to the position related information, a degree of mutual interference between uplink and downlink signals of the at least two UEs during full-duplex transmission comprises:
      determining, according to each of the short-distance communication equipment identities, that mutual interference exists between a UE which reports the short-distance communication equipment identity and the UE which the short-distance communication equipment identity belongs to.

6. The method according to claim 2, wherein obtaining a degree of self-interference of a transmit signal on a received signal during full-duplex transmission comprises:
   obtaining power information of self-interference of the transmit signal on the received signal;
   obtaining, according to the power information of self-interference and power information of the received signal, a degree of difference between self-interference power and received signal power; and
   determining, according to the degree of difference, a degree of self-interference.

7. The method according to claim 1, wherein the number of UEs transmitting uplink signals on the same time and frequency resource unit is at least two, and signal vector spaces of the UEs transmitting uplink signals on the same time and frequency resource unit are orthogonal to each other; and/or
   the number of UEs receiving downlink signals on the same and frequency resource unit is at least two, and signal vector spaces of the UEs receiving downlink signals on the same and frequency resource unit are orthogonal to each other.

8. The method according to claim 1, wherein determining, according to the interference degree among the at least two UEs, one or more UEs transmitting uplink signals and one or more UEs receiving downlink signals on one time and frequency resource unit on which the uplink signals and the downlink signals are transmitted comprises:
   determining a schedule weight of uplink transmission and downlink transmission performing by each UE on the time and frequency resource unit; and
   one of the following processes:
      determining, according to the schedule weight of uplink transmission, UEs transmitting uplink signals on the time and frequency resource unit, and then determining, according to the interference degree and the schedule weight of downlink transmission, UEs receiving downlink signals on the time and frequency resource, or
      determining, according the schedule weight of downlink transmission, UEs receiving downlink signals on the time and frequency resource unit, and then determining, according to the interference degree and the schedule weight of uplink transmission, UEs transmitting uplink signals on the time and frequency resource.

9. The method according to claim 1, wherein determining, according to the interference degree among the at least two UEs, one or more UEs transmitting uplink signals and one or more UEs receiving downlink signals on one time and frequency resource unit on which the uplink signals and the downlink signals are transmitted comprises:
determining combinations of UEs allowed to performing uplink and downlink transmission simultaneously and schedule weights of the combinations during full-duplex transmission; and
determining, according to the schedule weights during full-duplex transmission, UE combinations for uplink and downlink transmission on all time and frequency resource units on which full-duplex transmission is able to be performed.

10. A site device, comprising:
a receiver, configured to receive uplink signals from at least two user equipments (UEs);
a computer readable storage medium, configured to store instructions; and
a processor coupled to the computer readable storage medium, wherein the processor is configured to:
obtain an interference degree that is caused when the site device performs full-duplex transmission with the at least two UEs; and
determine, according to the interference degree among the at least two UEs, one or more UEs transmitting uplink signals and one or more UEs receiving downlink signals on one time and frequency resource unit on which the uplink signals and the downlink signals are transmitted simultaneously, and determine the time and frequency resource unit configured to transmit the uplink signals and the downlink signals simultaneously.

11. The device according to claim 10, wherein the processor is further configured to:
obtain the degree of mutual interference between uplink and downlink signals of the at least two UEs during full-duplex transmission; or
obtain a degree of self-interference of a transmit signal on a received signal of the site device during full-duplex transmission.

12. The device according to claim 10, wherein the receiver is further configured to receive position information of the at least two UEs sent by the at least two UEs; and
the processor is further configured to:
determine, according to the position information of the at least two UEs, a relative distance between the at least two UEs, and
determine, according to the relative distance, the degree of mutual interference, wherein the shorter the relative distance is, the higher the degree of mutual interference is.

13. The device according to claim 10, wherein
the processor is further configured to:
determine, according to the uplink signals, the position information of the at least two UEs,
determine, according to the position information of the at least two UEs, a relative distance between the at least two UEs, and
determine, according to the relative distance, the degree of mutual interference, wherein the shorter the relative distance, the higher the degree of mutual interference.

14. The device according to claim 10, wherein the receiver is further configured to:
receive short-distance communication equipment identities sent by the at least two UEs, wherein a short-distance communication equipment identity is an equipment identity of a UE allowed to perform short-distance communication with the UE; and
the processor is further configured to:
determine, according to each of the short-distance communication equipment identities, that mutual interference exists between a UE which reports the short-distance communication equipment identity and the UE which the short-distance communication equipment identity belongs to.

15. The device according to claim 11, wherein the processor is further configured to:
obtain power information of self-interference of the transmit signal on the received signal,
obtain, according to the power information of self-interference and power information of the received signal, a degree of difference between self-interference power and received signal power, and
determine, according to the degree of difference, a degree of self-interference.

16. A method for handling full-duplex interference, by a site device, the method comprising:
receiving uplink signals from at least two user equipments (UEs);
obtaining an interference degree that is caused when the site device performs full-duplex transmission with at the least two UEs; and
determining according to the interference degree among the at least two UEs, one or more UEs transmitting uplink signals and one or more UEs receiving downlink signals on one time and frequency resource unit on which the uplink signals and the downlink signals are transmitted simultaneously, and determining a time and frequency resource unit configured to transmit the uplink signals and the downlink signals simultaneously;
wherein obtaining an interference degree that is caused when the site device performs full-duplex transmission with at least two UEs comprises:
obtaining a degree of self-interference of a transmit signal on a received signal of the site device during full-duplex transmission.

17. The method according to claim 16, wherein obtaining a degree of self-interference of a transmit signal on a received signal during full-duplex transmission comprises:
obtaining power information of self-interference of the transmit signal on the received signal;
obtaining, according to the power information of self-interference and power information of the received signal, a degree of difference between self-interference power and received signal power; and
determining, according to the degree of difference, a degree of self-interference.

18. A site device, comprising:
a receiver, configured to receive uplink signals from at least two user equipments (UEs);
a computer readable storage medium, configured to store instructions; and
a processor coupled to the computer readable storage medium, wherein the processor is configured to:
obtain an interference degree that is caused when the site device performs full-duplex transmission with the at least two UEs;

determine, according to the interference degree among the at least two UEs, one or more UEs transmitting uplink signals and one or more UEs receiving downlink signals on one time and frequency resource unit on which the uplink signals and the downlink signals are transmitted simultaneously, and determine the time and frequency resource unit configured to transmit the uplink signals and the downlink signals simultaneously; and obtain a degree of self-interference of a transmit signal on a received signal of the site device during full-duplex transmission.

19. The device according to claim 18, wherein the processor is further configured to:
obtain power information of self-interference of the transmit signal on the received signal;
obtain, according to the power information of self-interference and power information of the received signal, a degree of difference between self-interference power and received signal power, and
determine, according to the degree of difference, a degree of self-interference.

20. The method according to claim 5, further comprising:
sending, by the site device, the short-distance communication equipment identity to a neighboring site device.

21. The device according to claim 14, wherein the device further comprises:
a transmitter, configured to send the short-distance communication equipment identity to a neighboring site device.

* * * * *